United States Patent
Abe et al.

[19]

[11] Patent Number: 6,162,074
[45] Date of Patent: Dec. 19, 2000

[54] CARD CONNECTOR

[75] Inventors: Shintaro Abe, Chiba; Yoshihisa Yamamoto, Kanagawa, both of Japan

[73] Assignee: The Whitaker Corporation, Wilmington, Del.

[21] Appl. No.: 09/311,348

[22] Filed: May 13, 1999

[30]     Foreign Application Priority Data

May 27, 1998  [JP]  Japan .................................. 10-146294

[51] Int. Cl.[7] .................................................. H01R 13/62
[52] U.S. Cl. ........................................... 439/159; 439/152
[58] Field of Search ......................... 439/159, 64, 541.5, 439/325, 153, 154, 155, 156, 157, 158, 160, 79

[56]           References Cited

U.S. PATENT DOCUMENTS 5,051,101  9/1991  Komatsu .................................. 439/159
5,490,791  2/1996  Yamada et al. ........................... 439/159
5,643,001  7/1997  Kaufman et al. ......................... 439/159
5,655,918  8/1997  Soh .......................................... 439/159
5,707,245  1/1998  Yamammoto et al. .................. 439/160
5,795,190  8/1998  Ono ......................................... 439/607

OTHER PUBLICATIONS

Japanese Patent Application No. 7–244710.

*Primary Examiner*—Gary F. Paumen
*Assistant Examiner*—Alexander Gilman

[57]            ABSTRACT

The present invention provides a card connector which allows secure stopping of ejection levers in a header housing accommodating a plurality of cards. An intermediate wall (20) has a stop member (22) that stops pivoting of an ejection lever (41) of ejection mechanism (40). The intermediate wall is formed separately from a partition wall (13), which is formed as an integral part of header housing (10) of card connector (1) and which forms a partition between a plurality of cards, but the intermediate wall is attached to the partition wall (13). An inclined surface (25) facilitates insertion of the cards, and it is located on an end surface on the card insertion side of the stop member (22).

7 Claims, 4 Drawing Sheets

CARD CONNECTOR

FIELD OF THE INVENTION

The present invention relates to a card connector equipped with an ejection mechanism which has an ejection lever that ejects a plurality of cards accommodated in a header housing of the card connector.

BACKGROUND OF THE INVENTION

Card connector 100 shown in FIG. 6 is a conventional card connector disclosed in Japanese Patent Publication No. 7-244710. Card connector 100 has a header housing 110 including upper and lower housing members 111, 112 that accommodate two memory cards 150, a plurality of electrical pin contacts 120 which are mounted in the housing members 111, 112 and which electrically connect the two cards 150 to a circuit board (not shown), a guide frame 130 which connects the two housing members 111, 112 together and which guides the cards 150 into the housing members, and an ejection mechanism 140 which ejects the two cards 150 accommodated in the housing members 111, 112. The ejection mechanism 140 is equipped with two ejection levers 141 (only one is shown) which respectively eject the two cards 150 accommodated in the housing members 111, 112 by pivoting, and a single operating member 142 which can be connected with one or the other of the ejection levers 141 by switching therebetween.

In order to eject the respective cards 150 accommodated in the housing members 111, 112, the operating member 142 is switched to the side of the card 150 selected for ejection; afterward, the operating member 142 is pushed in the direction indicated by arrow A in FIG. 6, so that one of the ejection levers 141 is caused to pivot. A resilient member 143, which has an engaging projection that engages with a slot 144 in the guide frame 130, is located on the operating member 142, and the operating member 142 can be pushed until the engages projection (not shown) on the resilient member 143 engaging the opening rim of the slot 144.

However, in the case of the conventional card connector, no stop mechanism is provided in order to stop the pivoting of the ejection levers 141 themselves. As a result, after the cards 150 accommodated in the housing members 111, 112 have been ejected, the ejection levers 141 do not stop; instead, the end portions of the ejection levers 141 protrude a considerable distance from the header housing 110, so that there is a danger of interference when the next cards 150 are inserted.

Accordingly, the object of the present invention is to provide a card connector which allows the secure stopping of ejection levers in a header housing accommodating a plurality of cards.

SUMMARY OF THE INVENTION

The card connector of the present invention is equipped with a header housing that accommodates a plurality of memory cards, a plurality of electrical pin contacts are secured in the header housing for electrically connecting the plurality of cards to a circuit board, and an ejection mechanism has an ejection lever that ejects the cards accommodated in the header housing by pivoting relative to the header housing, an intermediate wall has a stop member that stops the pivoting of the ejection levers of the ejection mechanism and is separate from a partition wall, which is an integral part of the header housing, is a partition between the plurality of cards, the intermediate wall is attached to the partition wall.

An inclined surface to facilitates the insertion of the cards in card-accommodating recesses is located at an end on the card insertion side of the stop member of the intermediate wall.

BRIEF DESCRIPTION OF THE DRAWINGS

An embodiment of the present invention will now be described by way of example with reference to the accompanying drawings in which:

FIG. 5A shows the position of the ejection levers in a state in which cards are inserted into the header housing; FIG. 5B shows the position of the ejection levers after the cards have been ejected from the header housing.

DETAILED DESCRIPTION OF THE INVENTION

Figure 1:
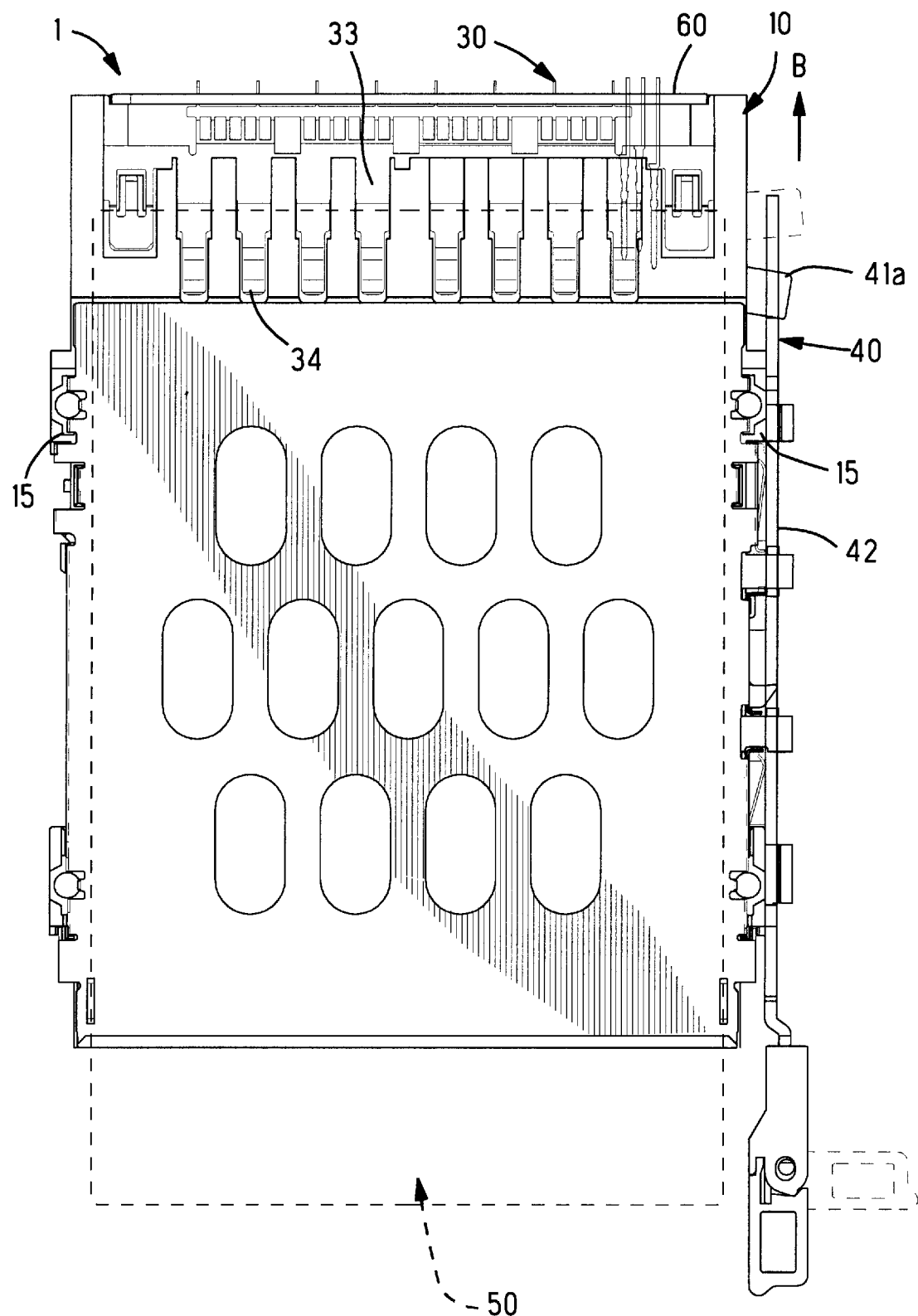
FIG. 1 is a top plan view of a card connector of the present invention.
Figure 2:
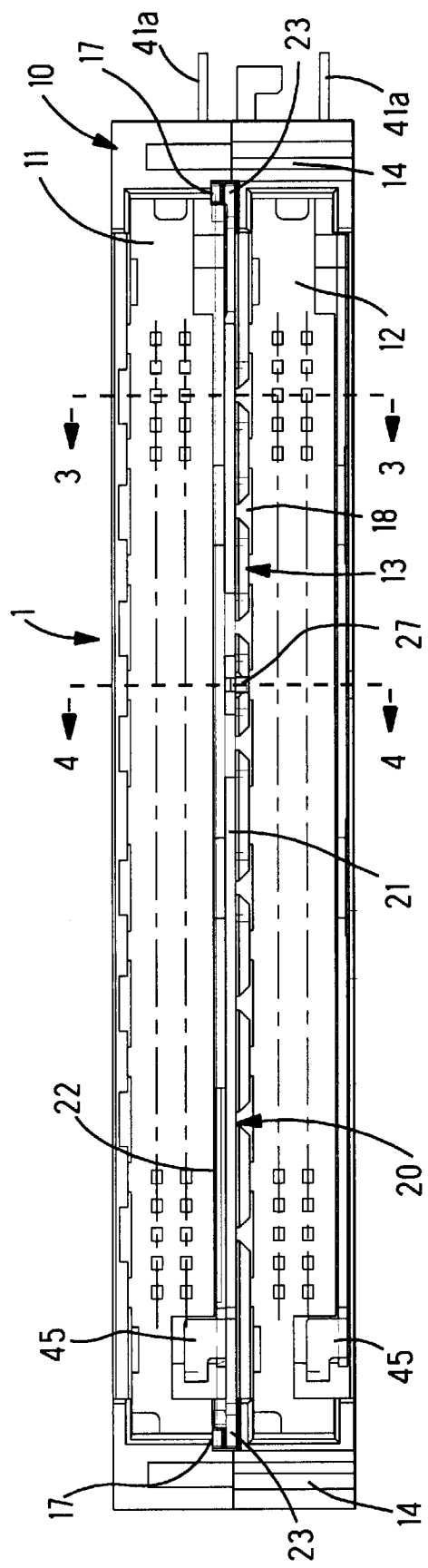
FIG. 2 is a front view of the card connector shown in FIG. 1; however, guide members and operating members are omitted therefrom.
Figure 6:
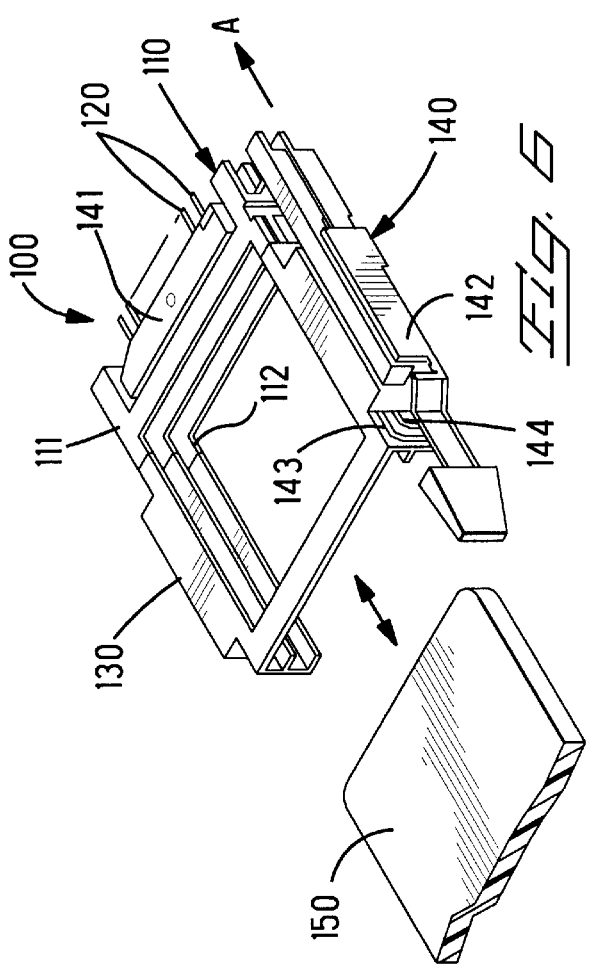
FIG. 6 is a perspective view of a conventional card connector.
Figure 3:
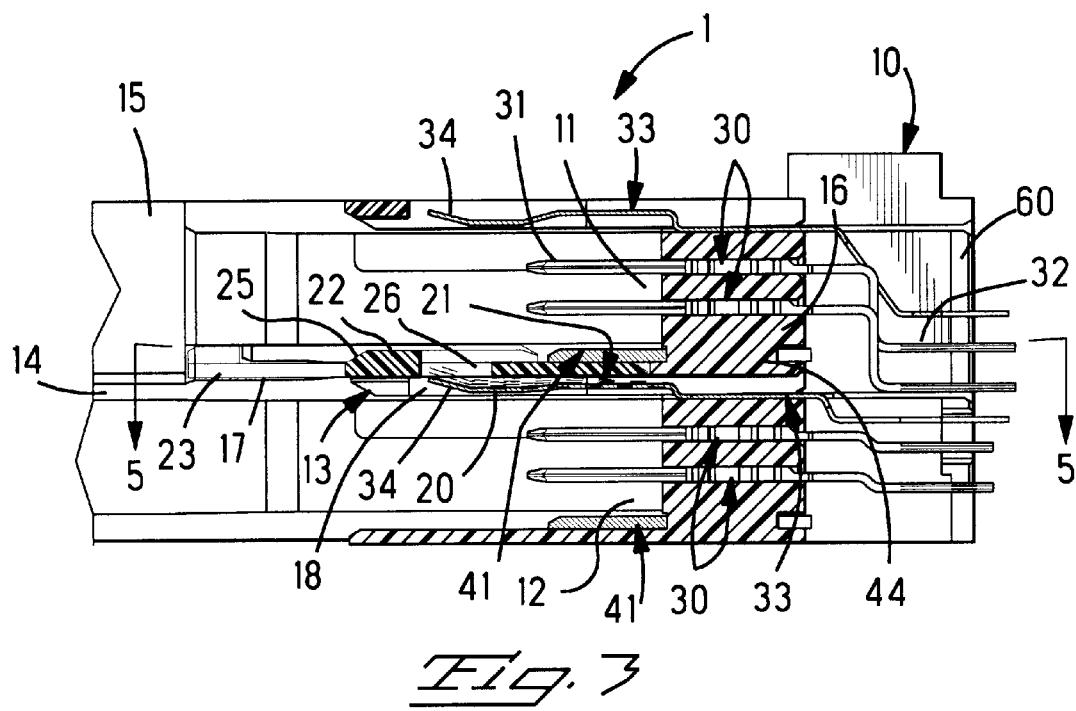
FIG. 3 is a part cross-sectional view taken along line 3—3 in FIG. 2.

In FIGS. 1 through 5, card connector 1 is equipped with a header housing 10, which is capable of accommodating two memory cards 50, a plurality of electrical pin contacts 30, which are secured in the header housing 10 and which electrically connect the two cards 50 to a circuit board 60, and an ejection mechanism 40, which has ejection levers 41 that are capable of ejecting the two cards 50 accommodated in the header housing 10 by pivoting relative thereto. In the present embodiment, the cards 50 are PC cards such as memory cards.

The header housing 10 is an integral housing with substantially the shape of a rectangular parallelepiped which is formed by molding a suitable dielectric resin material. Housing 10 has an upper card-accommodating recess 11 which accommodates an upper card 50, and a lower card-accommodating recess 12 which accommodates a lower card 50. Furthermore, a partition wall 13 is located between the upper card-accommodating recess 11 and lower card-accommodating recess 12. Portions of both side walls of the header housing 10 that face the lower card-accommodating recess 12 include seat members 14 for guide member 15 that extend to the left in FIG. 3 as integral parts. Guide members 15 are separate from the header housing 10, they guide the insertion of the upper and lower cards 50, and they are mounted in the seat members 14.

An intermediate wall 20, which is separate from the partition wall 13 and which has a stop member 22 that stops the pivoting of the ejection levers 41 of the ejection mechanism 40, is attached to the partition wall 13 of the header housing 10. Intermediate wall 20 extends in the left-right direction (i.e., the left-right direction in FIG. 2), and it is equipped with a flat plate section 21, which crosses the partition wall 13, and a pair of supporting arms 23, which protrude from the left and right sides of the flat plate section 21. Supporting arms 23 are inserted into grooves 17 located in both side walls of the header housing 10 (see FIG. 5).

Figure 4:
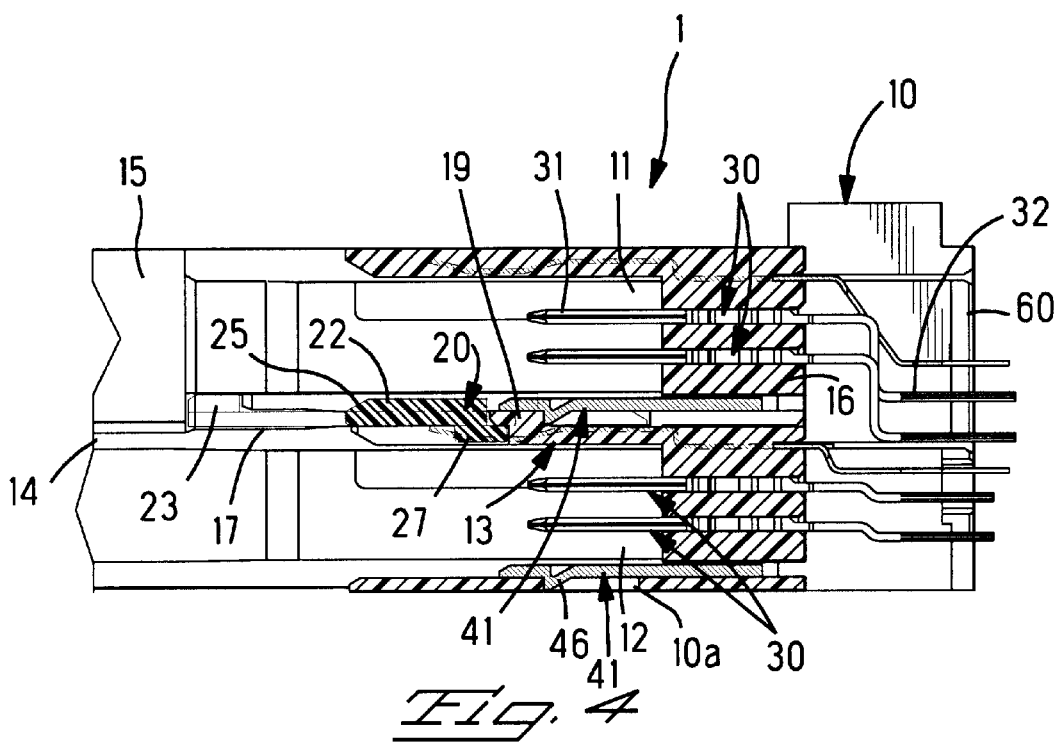
FIG. 4 is a part cross-sectional view taken along line 4—4 in FIG. 2.

Intermediate wall 20 is formed by molding an insulating resin material. The movement of the intermediate wall 20 in a vertical direction is regulated as a result of the insertion of the supporting arms 23 into the grooves 17, while movement in the forward direction is regulated as a result of the contact of the front ends of the supporting arms 23 with the guide member 15, and movement in the rearward direction is regulated as a result of engagement of a rear surface of the flat plate section 21 with contact-mounting section 16 of the header housing 10. The stop member 22 of the intermediate wall 20 is disposed along a front edge of the flat plate section 21 from the right-side supporting arm 23 toward the left-side supporting arm 23, and it extends upward from the flat plate section 21. Furthermore, an opening 24, which enables inner ends of the ejection levers 41 to protrude slightly during the ejection of the cards, is located between an inner end of the stop member 22 and the left-side supporting arm 23. An inclined surface 25, which is used to facilitate the insertion of the cards 50, is located on a front end surface on the card-insertion side of the stop member 22 (see FIGS. 3 and 4). As a result, even though the stop member 22 protrudes slightly upward from the intermediate wall 20, the cards 50 can easily be inserted as a result of the presence of inclined surface 25. Furthermore, as shown in FIG. 4, a projection 27, which protrudes downward is located in substantially the central portion of the intermediate wall 20 with respect to the left-right direction. Projection 27 fits into the lower side of protruding section 19, which protrudes upward from the partition wall 13, and thus acts as a reinforcement thereby preventing the relatively-thin partition wall 13 from flexing downward.

The electrical pin contacts 30 are installed in two rows respectively facing the upper card-accommodating recess 11 and lower card-accommodating recess 12 in the contact-mounting section 16 of the header housing 10. An inner end of each pin contact 30 constitutes a contact section 31, which electrically connects with an electrical receptacle inside each card 50. An outer end of each pin contact 30 is bent and constitutes a connecting section 32, which is electrically connected with the circuit board 60. Two ground plates 33 are also disposed on the contact-mounting section 16 of the header housing 10 respectively facing the upper card-accommodating recess 11 and lower card-accommodating recess 12. A plurality of resilient contacts 34 are located on a front end of each ground plate 33; the resilient contacts 34 electrically engage ground plates of the cards 50. When the resilient contacts 34 electrically engage the ground plates of the cards 50, the resilient contacts 34 are bent upward; however, a plurality of openings 18, 26, which receive the resilient contacts 34 are located in the partition wall 13 and intermediate wall 20.

The ejection mechanism 40 includes two ejection levers 41 which are capable of ejecting the two cards 50 accommodated in the upper card-accommodating recess 11 and lower card-accommodating recess 12 of the header housing 10 by pivoting relative thereto, and two operating members 42 respectively connected to outer end 41a of each of the ejection levers 41. The respective ejection levers 41 are disposed inside the respective card-accommodating recesses 11, 12 from a front side of the header housing 10; afterward, the intermediate wall 20 is attached to the partition wall 13 from the front side of the header housing 10. Consequently, the presence of the stop member 22 installed on the intermediate wall 20 does not interfere when the upper ejection lever 41 when it is mounted inside the upper card-accommodating recess 11, so that the ejection levers 41 can easily be assembled in their respective positions. After the respective ejection levers 41 have been disposed inside the respective card-accommodating recesses 11, 12, the respective operating members 42 are connected to the outer ends 41a of the respective ejection levers 41 along the guide member 15.

Figure 5A:
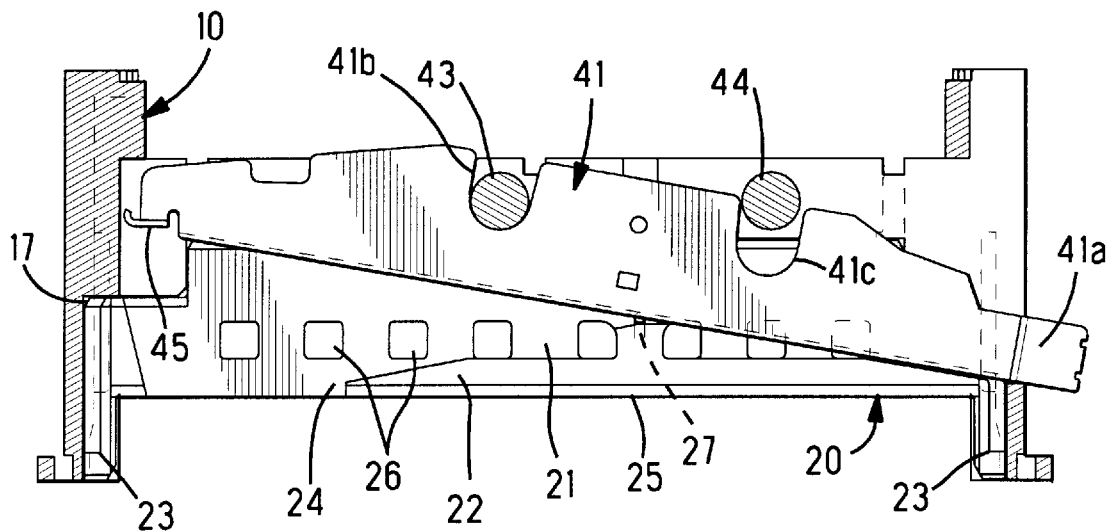
FIGS. 5A and 5B are cross-sectional views taken along line 5—5 in FIG. 3.
Figure 5B:
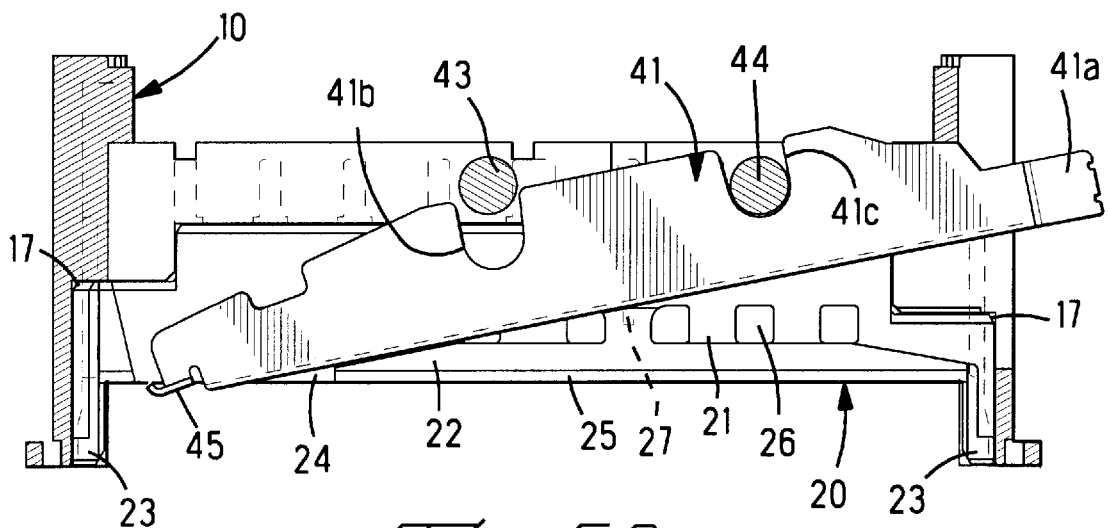

The card 50 inserted into the upper card-accommodating recess 11 is ejected by pushing the operating member 42 of the ejection mechanism 40 in the direction indicated by arrow B in FIG. 1. In this case, as shown in FIG. 5A, the ejection lever 41 via a U-shaped recess 41b thereof first pivots about a first supporting shaft 43 located toward the left side of the header housing 10; then, as shown in FIG. 5B, the ejection lever 41 via a U-shaped recess 41c thereof pivots about a second supporting shaft 44 located toward the right side of the header housing 10, so that the card 50 is ejected by inner end 45 on the opposite side from the operating member 42. During the ejection of the card 50, a front edge of the ejection lever 41 adjacent inner end 45 engages the stop member 22 of the intermediate wall 20. As a result, the inner end 45 of the ejection lever 41 does not protrude any great distance from the header housing 10 following the ejection of the card 50 accommodated in the upper card-accommodating recess 11 of the header housing 10, so that there is no interference with the insertion of the next card 50.

Furthermore, the card 50 inserted into the lower card-accommodating recess 12 is similarly ejected by pushing the operating member 42 of the ejection mechanism 40 in the direction indicated by arrow B in FIG. 1. In this case, the ejection lever 41 operates in the same manner as the upper ejection lever 41. Moreover, during the ejection of the card 50, the lower ejection lever 41 stops as a result of projection 46 protruding downward from the ejection lever 41 engaging a front edge of opening 10a located in the lower wall of the header housing 10.

In the card connector of the present invention, an intermediate wall, which has a stop member that stops the pivoting of an ejection lever of an ejection mechanism and which is located separately from a partition wall, which is an integral part of a header housing and which forms a partition between a plurality of memory cards, is attached to the partition wall. Accordingly, pivoting of the ejection levers themselves relative to the header housing can be securely stopped, so that after the cards accommodated in the header housing have been ejected, inner ends of the ejection levers do not protrude any great distance from the header housing, thus eliminating any interference with the insertion of the next cards into card-accommodating recesses. Furthermore, the intermediate wall is separate from the partition wall, which is an integral part of the header housing; accordingly, the intermediate wall can be assembled to the partition wall after the ejection levers have been attached inside the card-accommodating recesses. Thus, the stop member disposed on the intermediate wall does not interfere when the ejection levers are assembled inside the card-accommodating recesses. As a result, the ejection levers can easily be assembled.

An inclined surface, which facilitates the insertion of the cards into the header housing is located on an end surface on the card-insertion side of the stop member of the intermediate wall. Accordingly, even though the stop members protrudes from the intermediate wall, the cards can easily be inserted as a result of the presence of the inclined surface.

What is claimed is:

1. A card connector for accommodating a plurality of memory cards, comprising:

a dielectric header housing having an upper card-accommodating recess and a lower card-accommodating recess;

electrical contacts secured in the header housing and having contact sections extending into the upper card-accommodating and the lower card-accommodating recess;

a wall separating the upper card-accommodating recess and the lower card-accommodating recess;

an upper ejection lever pivotally mounted on the header housing and extending along the wall for ejecting a memory card from the upper card-accommodating recess;

a lower ejection lever pivotally mounted on the header housing for ejecting a memory card from the lower card-accommodating recess;

operating members connected to the upper ejection lever and the lower ejection lever to operate the upper ejection lever and the lower ejection lever to eject a memory card from the upper card-accommodating recess and the lower card-accommodating recess; and a stop member on the wall against which the upper ejection lever engages the stop member being located in front of the upper election lever to prevent the upper ejection lever from entering the upper card-accommodating recess.

2. A card connector as claimed in claim 1, wherein of the header housing has a lower wall along which the lower ejection lever extends, the lower wall has an opening in which a projection on the lower ejection lever is disposed thereby stopping movement of the lower ejection lever so that the lower ejection lever is prevented from entering the lower card-accommodating recess.

3. A card connector as claimed in claim 1, wherein the wall includes a partition wall as an integral wall of the header housing and an intermediate wall attached to the partition wall.

4. A card connector as claimed in claim 3, wherein the intermediate wall has the stop member thereon.

5. A card connector for accommodating a memory card, comprising:

a dielectric header housing having a card-accommodating recess;

electrical contacts secured in the header housing and having contact sections extending into the card-accommodating recess;

a wall of the header housing extending along the card-accommodating recess;

an ejection lever pivotally mounted on the header housing for ejecting a memory card from the card-accommodating recess;

an operating member connected to the ejection lever to operate the ejection lever to eject the memory card from the card-accommodating recess; and a stop member on the wall against which the ejection lever engages, the stop member being located in front of the upper election lever to prevent the ejection lever from entering the card-accommodating recess.

6. A card connector as claimed in claim 5, wherein the wall includes a partition wall as an integral wall of the header housing and an intermediate wall attached to the partition wall.

7. A card connector as claimed in claim 6, wherein the intermediate wall has the stop member thereon.

* * * * *